Sept. 1, 1970 R. J. SCHWARTZ 3,526,874
METHOD AND APPARATUS FOR SONIC DIP MEASUREMENT
Original Filed Sept. 23, 1966 4 Sheets-Sheet 1
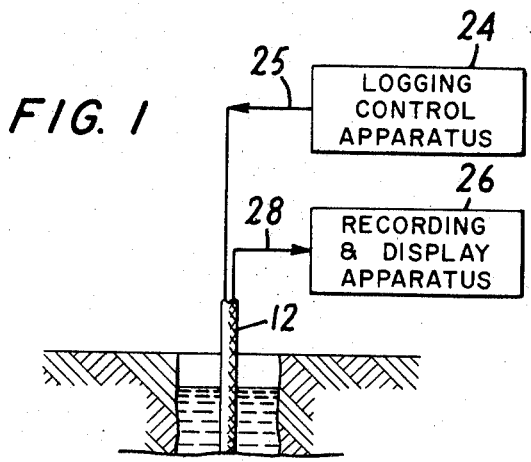
FIG. 1
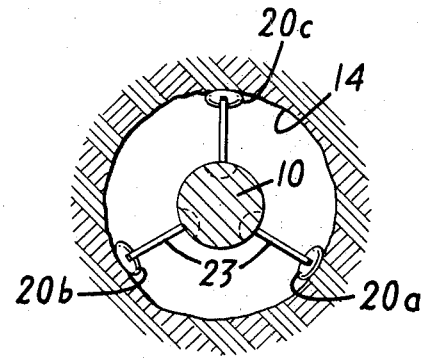
FIG. 2
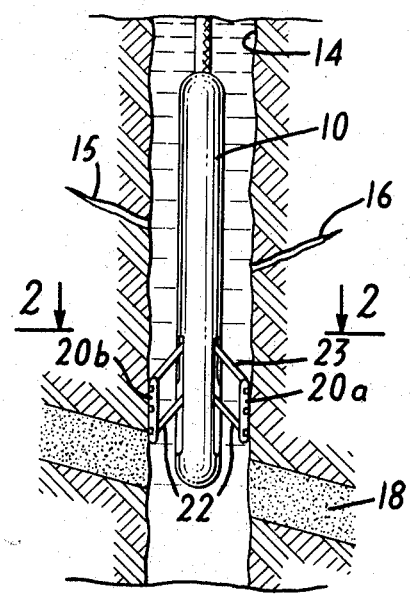
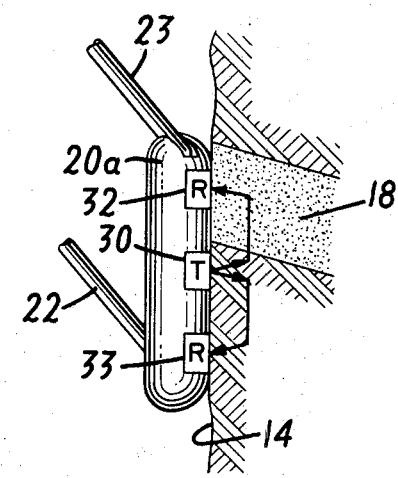
FIG. 3
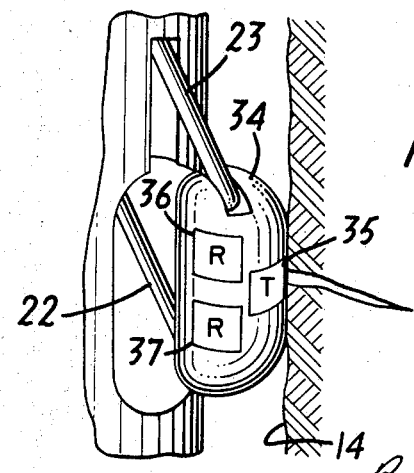
FIG. 4
INVENTOR.
ROBERT J. SCHWARTZ
BY
Brumbaugh, Free, Graves & Donohue
his ATTORNEYS či # United States Patent Office 3,526,874
Patented Sept. 1, 1970

3,526,874
METHOD AND APPARATUS FOR SONIC DIP MEASUREMENT
Robert J. Schwartz, Houston, Tex., assignor to Schlumberger Technology Corporation, Houston, Tex., a corporation of Texas
Continuation of application Ser. No. 581,572, Sept. 23, 1966. This application Sept. 18, 1968, Ser. No. 808,721
Int. Cl. G01v 1/22, 1/40
U.S. Cl. 340—15.5                                    19 Claims

ABSTRACT OF THE DISCLOSURE

A sonic method and apparatus for determining the disposition of strata surrounding an earth borehole in which three electroacoustic devices are arranged laterally equiangularly about a well tool. Each device includes a sonic transmitter longitudinally centered between a pair of receivers. The amplitudes of the electrical signals developed by the receivers for each acoustic transmission are compared at a selected instant of time to develop an output pulse having a characteristic polarity indicating the receiver first to receive the transmitted acoustic signal.

---

This application is a continuation of application Ser. No. 581,572, filed Sept. 23, 1966 and now abandoned.

This invention relates to apparatus and methods for determining the disposition of earth strata intercepted by a borehole. More specifically, the invention pertains to improved methods and apparatus using acoustic energy transmission for detecting the angle and azimuthal direction of the dip of earth formations.

It is common practice to use well logging equipment known as a dipmeter for determining the angle and azimuthal direction of the dip or inclination of earth strata traversed by a borehole. One conventional form of dipmeter includes three electrodes equally spaced, i.e., at 120° intervals, in a plane perpendicular to the axis of the logging instrument. These electrodes furnish, when excited, three logs of the resistivity of the surrounding formations. By comparing the three logs, the location and disposition of formation layers surrounding the borehole can be estimated.

The resistivity type of dipmeter suffers from an inability to operate in boreholes filled with an insulative oil base drilling mud, since satisfactory logging indications depend on the conductivity or resistivity measurements through the drilling fluid and surrounding media. Moreover, the electrode spacing required for satisfactory operation of this logging tool precludes practicable focusing of the electrodes upon a short longitudinal portion of the formation and, therefore, the tool does not always yield good logging resolution.

In a copending application Ser. No. 484,926, filed Sept. 3, 1965, now Pat. No. 3,376,950, issued Apr. 9, 1968, in the name of D. R. Grine, for "Sonic Dipmeter," assigned to the assignee of the present invention, there are disclosed improved methods and apparatus for obtaining formation dipmeasurements employing acoustic energy. That application describes well logging apparatus which includes a well tool having at least three pads equiangularly spaced from each other and up against the wall of the borehole, each of the pads containing at least one transmitting and one receiving electroacoustic transducer. In each pad, the transmitting transducer is pulsed with electrical energy to transmit acoustic energy into the formations. After traversing the intervening distance through the formations, the acoustic energy reaches the receiving transducers and develops an electrical impulse in response thereto. The electrical signal generated by the receiving transducer in each pad is then processed through electronic circuitry to develop a log indicative of the travel time of the acoustic energy between the transducer pair, and the several individual travel time measurements correlated to give the dip indication. With this arrangement, many of the disadvantages of the prior art resistivity techniques are overcome.

The object of the present invention is to provide a new and improved sonic dipmeasurement method and apparatus which avoid the disadvantages of the resistivity arrangements and at the same time increases the accuracy of measurement of the aforementioned acoustic system.

Briefly, according to the present invention, at least two receiving transducers are contained in each pad, the receivers being spaced in opposite longitudinal directions and preferably equidistantly from an acoustic transmitter. Each of the receiving transducers generates an electrical signal in response to the acoustic energy transmitted through the formations in opposite directions from the transmitter. These electrical signals are then compared to develop an output signal representative of the relative times of arrival of acoustic energy at the respective receivers.

If the longitudinal portion of a formation spanned by a receiver pair is homogeneous, i.e., if it contains no discontinuities and is of relatively constant density, the electrical signals generated by the receivers occur essentially simultaneously and give rise to an output signal having an amplitude less than a predetermined reference level. If, on the other hand, a formation discontinuity is encountered by the acoustic energy traveling from the transmitter toward one of the receivers, the arrival time of the acoustic energy at the receivers will differ and an output pulse is generated having a polarity, relative to a reference level, indicative of the relative times of arrival. When, in the systems to be described, the time of arrival of acoustic energy at one of the receivers precedes the arrival of acoustic energy at the other receivers the output signal will be a pulse of one polarity; when the converse is true, an output pulse of the opposite polarity is generated. In general, the amplitudes of the respective electrical signals generated by the receivers in each pad at a selected instant of time will differ when the acoustic energy arrival times at the receivers are unequal. In the present system, the amplitudes of the signals are compared at that time to develop the output pulse of which the polarity corresponds to the sign of the arithmetical difference between them.

The respective transmitters carried by the pads may be sequentially pulsed in a repetitive cycle so that the output signal is either below the reference level or includes a train of pulses signifying a difference in the times of arrival of acoustic energy at the respective receivers in each pad. Alternatively, the respective transmitters may be pulsed simultaneously, since typically the travel time from a transmitter to its associated receivers is less than that to the receivers of another pad array.

For a better understanding of the invention, and the further aspects, advantages and objects thereof, reference may be made to the following detailed description taken in conjunction with the accompanying drawings, wherein:

FIG. 1 is a schematic representation of a well logging system in accordance with the invention;

FIG. 2 is a cross-sectional view through the well tool shown in the FIG. 1 system, taken generally along the line 2—2;

FIG. 3 is an enlarged elevational view of one arrangement of the transducer array in the pads carried by the well tool;

FIG. 4 is an enlarged elevational view of another form of electroacoustic transducer pad which may be used within the well tool shown in FIG. 1;

Figure 5:
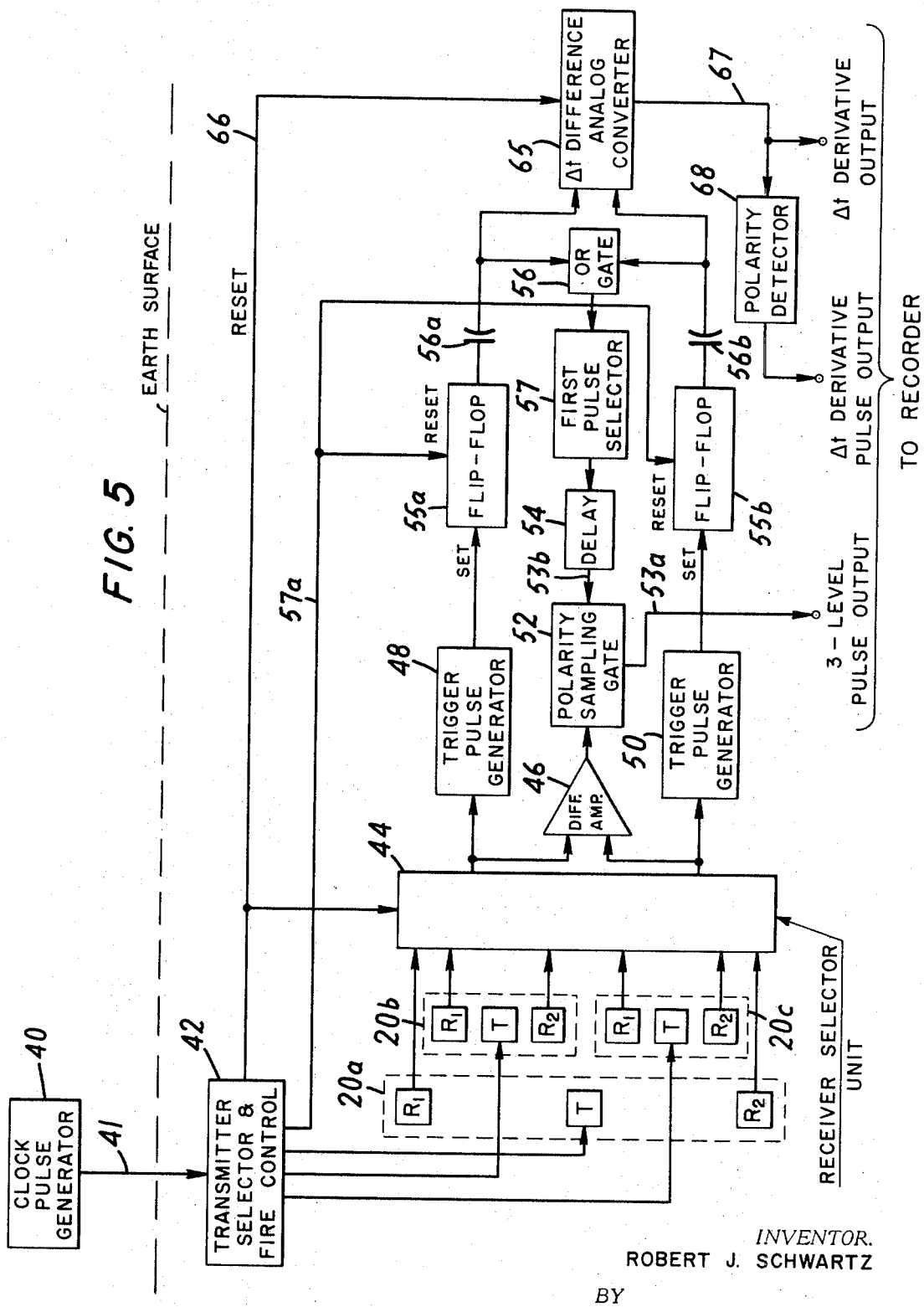
FIG. 5 is a detailed block diagram of electrical apparatus making up a portion of the FIG. 1 system.

FIG. 1 generally illustrates a well logging system including a well tool or sonde 10 suspended from a cable 12 in an earth borehole 14 for determining the dip characteristics of formation strata traversed by the borehole. As shown, the formation surrounding the borehole may include fractures, such as those indicated at 15 and 16, the strata, such as indicated at 18, which intercept the borehole at some angle and azimuthal direction which are to be determined. Associated with the sonde 10 are at least three electroacoustic devices or pads 20a, 20b, and 20c which are equiangularly spaced from each other in a lateral plane perpendicular to the axis of the sonde 10, as best observed in FIG. 2.

Each of the pads 20a–20c is supported by a pair of parallel arms 22 and 23, attached to the body of the sonde 10 and which can be actuated for movement inwardly and outwardly from the sonde to vary the radial distance of the pads 20a–20c from the axis of the well tool. In general, the sonde 10 and pad arrangement is similar to the one shown and described in detail in the application Ser. No. 484,926, mentioned above, and no further description will be necessary here.

The cable 12, which is usually of the armored type, is played out over a winch (not shown) above ground which raises and lowers the sonde 10 in the borehole 14. At the surface, the system includes logging control apparatus 24 for providing power and control signals to the downhole equipment over a group of conductors 25 and recording and display apparatus 26 which receives electrical signals over the conductor 28 from electrical apparatus carried by the sonde 10.

In the enlarged view of FIG. 3, one preferred arrangement of the transducer array in a pad 20a is shown. When the pads are in a radially extended position for acoustically logging the formations, they are substantially against the wall of the borehole 14, as shown, to thereby emit and receive acoustic energy directly from the formations. In accordance with the invention, each pad 20a, 20b, 20c contains a transmitter 30 disposed between and longitudinally equidistantly from a pair of acoustic receivers 32 and 33, rather than in the more conventional arrangement in which a transmitter is located either above or below both receivers. When the transmitter 30 is electrically pulsed to yield an acoustic output having a frequency of, say, 50 to 200 kilocycles per second, acoustic energy is transmitted from the transmitter 30 in mutually opposite longitudinal directions through the formations. A portion of the acoustic energy transmitted through the formations reenters the borehole, as depicted by the arrowheaded lines, where it is detected by the receivers 32 and 33 which develop electrical signals corresponding to intensity variations of the received acoustic energy. As illustrated in FIG. 3, acoustic energy received by the receiver 33 travels through a substantially homogeneous medium, whereas the acoustic energy moving upwards and arriving at the receiver 32 encounters the stratum 18 traversed by the borehole. Owing to the discontinuity of the formations presented by the stratum 18, the times of arrival of acoustic energy at the respective receivers 32 and 33 will differ, and the electrical signals generated by the receivers will also be displaced in time, as will be explained shortly in greater detail.

FIG. 4 shows an alternate physical arrangement of the transducer array for a more compact receiver span and greater vertical logging resolution. There, a transmitter 35 is disposed laterally of and equidistantly between the receivers 36 and 37 carried by the pad 34. In this connection, it should be noted that in the usual case the distances between the transmitter 35 and the respective receivers will be equal, as shown. These distances, may not, however, always be exactly equal if the characteristics or physical configuration of the pad 34 gives rise to non-symmetric dispersion of the acoustic wave through the formation. That is, the receivers may be positioned to receive acoustic energy from the transmitter at the same instant of time, even though the spacings between each receiver and the transmitter are not exactly identical. Alternatively, when the receivers are not equally spaced from the transmitter, an electronic delay may be provided at the output of the near receiver so that the electrical signals fed to the cable conductor 28 will have the desired time relationship.

Referring now to FIG. 5, there is shown electrical apparatus for processing the electrical signals generated in response to acoustic energy detected by the receivers in the pads 20a, 20b, 20c. When logging formations, the sonde 10 (FIG. 1), is lowered to the desired depth. The arms 22 and 23 are then actuated to position the electroacoustic transducer pads 20a–20c against the wall of the borehole, and the sonde 10 is slowly moved uphole. As the sonde is drawn through the borehole, the respective transmitters T in the pads 20a–20c are repetitively pulsed at a relatively high repetition rate, or pulsed simultaneously or sequentially so that logging is essentially continuous throughout the length of the longitudinal formation zone of interest.

The transmitter pulsing rate is selected in consideration of two factors. The maximum rate is determined by the time it takes for a signal originating from a pad to decay to a degree which will not interfere with the desired signal shortly following the pulsing of the transmitter of the instant pad and the reception of acoustic energy by its associated receivers. The minimum rate is determined by the requirements of tool motion and desired vertical resolution, such that successive samples are taken more rapidly than the tool can move by the amount of the desired resolution.

Figure 7:
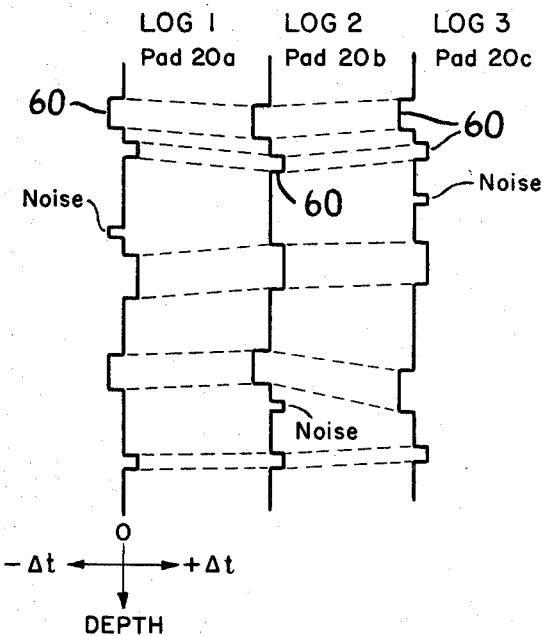
FIG. 7 is a graph of three logs such as might be obtained from earth bore logging with the FIG. 1 system.

Briefly, the FIG. 5 system compares the electrical signals from the respective receivers in each pad to develop an output signal which is indicative of the relative times of arrival of acoustic energy at the receivers, $R_1$ and $R_2$. When recorded, the output signal provides a record having three distinct amplitude levels, one level corresponding to the case in which acoustic energy arrives at one receiver, e.g., $R_1$, before it arrives at the other receiver $R_2$, another level representing the arrival of acoustic energy at the second receiver $R_2$ before arrival at the first receiver $R_1$, and a third, intermediate level representing equal times of arrival at the two receivers. As previously noted, the levels representing a disparity in the acoustic energy arrival times will be in pulse form and of a polarity, relative to the intermediate level, indicative of which of the receivers, $R_1$ or $R_2$, was first to receive the acoustic wave. FIG. 7 shows a representative graph of three trilevel logs such as might be obtained from the three pad system of FIG. 5.

Returning to FIG. 5, a conventional clock pulse generator 40 at the earth surface supplies pulses over a cable conductor 41 at a constant frequency rate, e.g., 1 kilocycle per second, to a transmitter selector and fire control unit 42 which either simultaneously or sequentially selects each of the transmitters T in the pads 20a–20c and generates pulses for exciting the selected transmitter(s). The clock pulse generator 40 may be mounted in the sonde itself, if desired. For sequential operation, the unit 42 may include an electronic stepping switch and a pulsed oscillator repetitively excited by pulses (FIG. 6(a)) from the clock pulse generator 40 for generating a burst of one to ten pulses of a signal of about 50 to 200 kilocycles per second. The pulse or burst of pulses is supplied to the transmitter T of one of the pads through the stepping switch which sequentially connects the respective transmitters T to the pulsed oscillator. A more detailed description of circuits for performing the functions required of the unit 42 may be found in the above-mentioned application Ser. No. 484,926.

The unit 42 also furnishes control pulses to a receiver selector unit 44, which may also contain a stepping switch, synchronized with the selection of the corresponding transmitters, for sequentially connecting the output of the receivers $R_1$, $R_2$ to a high gain differential amplifier 46 and trigger pulse generators 48, 50. Thus, the transmitter selector and fire control unit 42 will select the transmitter T in the pad 20a, for example, and simultaneously send a control signal to the receiver selector unit 44 to connect the receivers $R_1$ and $R_2$ of the same pad to the differential amplifier 46 and the trigger pulse generators 48 and 50, respectively. The transmitter T in the pad 20a is then energized by the pulse or burst of pulses, and after a predetermined time, the stepping switches in the units 42 and 44 are activated to select the transmitter and receivers in another pad, e.g., pad 20b. Preferably, the period between successive firing pulses will be greater than the longest time required for an acoustic signal to be detected by the receivers and processed through the system.

Figure 6:
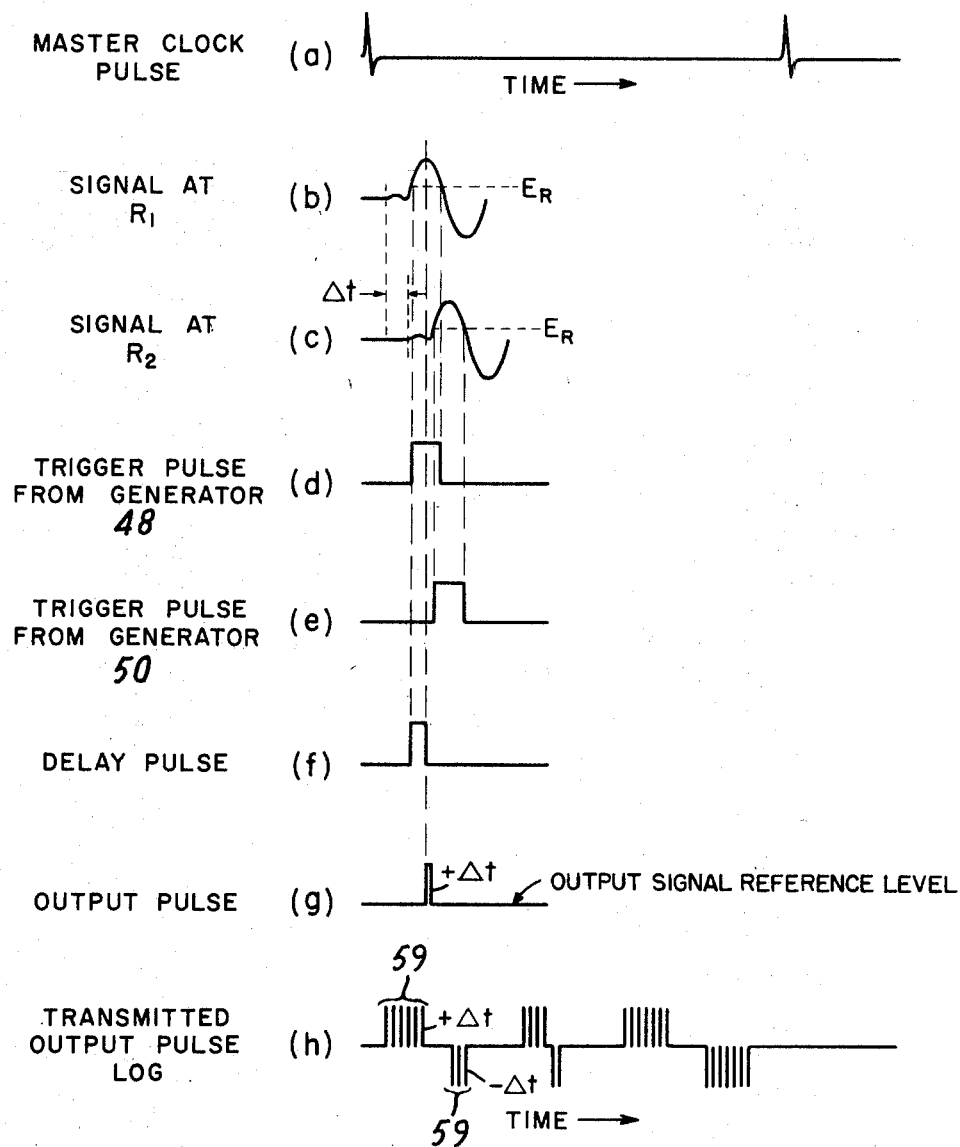
FIG. 6 is a graph of several waveforms helpful in understanding the operation of electrical apparatus shown in FIG. 5.

As seen from graphs (b) and (c) in FIG. 6, the electrical signals generated in the respective receivers $R_1$, $R_2$ are periodically varying electrical quantities whose amplitudes can be expected to be approximately equal in response to received acoustic energy traveling the same distance through the formations. For purposes of explanation, the signal of FIG. 6(c) produced by a receiver $R_2$ is shown to lag behind the signal of FIG. 6(b) generated by the receiver $R_1$. This discrepancy $\Delta t$ in the arrival times of the signals might indicate, for example, the presence of a stratum, such as that shown in FIGS. 1 and 3, having characteristics different than those of the other formations surrounding the borehole.

The differential amplifier 46 yields a difference signal having at all times a polarity corresponding to the sign of the instantaneous difference in the signal amplitudes. This difference signal is applied to a polarity sampling gate 52, which may be a bidirectional diode gate of the type described at pages 438–445 of Pulse and Digital Circuits, Millman and Taub, McGraw-Hill, 1956. The gate 52 is operable to pass the difference signal to the output conductor 53a whenever a signal is applied to the lead 53b. In addition, the gate 52 may include a conventional amplifier and limiting circuits so that the amplitude of the signals gated to the output conductor 53a are relatively uniform. The polarity sampling gate 52 is controlled by a signal from the delay unit 54, developed in a manner now to be described.

The trigger pulse generators 50, 48 are of the level detecting type, such as the Schmitt trigger, and provide trigger pulses, FIGS. 6(d) and 6(e), having widths corresponding to the times during which the amplitude of the signals from the receivers $R_1$, $R_2$ exceed a reference level $E_R$. These trigger pulses are applied to a respective flip-flop unit 55a, 55b which is initially in a "reset" condition and is "set," i.e., placed in the other of its conductive conditions, by the first pulse from its associated trigger pulse generator representing the "first arrival" excursion of the acoustic signal. The pulse outputs of the flip-flop units 55a, 55b are differentiated by the capacitors 56a, 56b to reshape the pulse signals into sharp spikes. These spikes, or sharp pulses, are received by an OR gate 56 which passes the sharp pulses to a first pulse selector 57, which may be a flip-flop also, where a further pulse is generated. This pulse has a duration which is sufficient to render the selector 57 unresponsive to the pulse generated by the flip-flop 56a or 56b which is last to be set, but which is shorter than the time period between successive pulses from the fire control unit 42. The output signal of the selector 57 energizes the delay unit 54.

In the delay unit 54, which may include a conventional one-shot multivibrator responsive to the initiation only of a pulse at the output of the selector 57, an enabling pulse (FIG. 6(f)) is produced, starting approximately simultaneously with the first trigger pulse detected and ending approximately one-quarter of the signal cycle after the initiation of this pulse. In the FIG. 6 illustration, the first trigger pulse is produced by pulse generator 48. This enabling pulse renders the polarity sampling gate 52 responsive to the difference signal at the output of the differential amplifier 46 for a short period at the trailing edge of the pulse, during which period the signal from the receiver $R_1$ attains its maximum amplitude. Therefore, as seen in FIG. 6(g), the output of the sampling gate 52 is a narrow pulse having a polarity corresponding to the instantaneous polarity of the difference signal.

Upon the occurrence of the next fire pulse from the unit 42, a reset pulse is sent over the conductor 57a to reset the flips-flops 55a, 55b to their original conditions and thus to ready the apparatus for processing of the next following first arrival pulses of the acoustic signals from another of the pads 20a–20c.

When the signals from the receivers $R_1$, $R_2$ in any of the pads 20a–20c arrive simultaneously, the difference signal at the output of the differential amplifier 46 will be essentially at a minimum and no output pulse will appear at the polarity sampler 52. In order to ensure that the output of the amplifier 46 is at the minimum or reference signal level when the acoustic waves arrive simultaneously, the amplifier 46 may be equipped to reject all difference signals below a predetermined signal threshold. In this manner, small spurious signals and noise will not disturb the amplifier output to cause an erroneous indication of a nonhomogeneity when the acoustic arrival times are equal.

It will be appreciated that when simultaneous pulsing of the transmitters T of the respective pads 20a–20c is desired, the receiver selecter unit 44 may be omitted, but the remaining circuitry of FIG. 5 must be provided for processing the acoustic signals from each of the pads.

It is noted from the foregoing that the system shown in FIG. 5 effectively compares the phase of the electrical signals generated by the receivers by taking the difference between signal amplitudes at a selected instant of time after the first detected arrival. This results in an output signal which is either a positive ($+\Delta t$) pulse representing the first arrival of acoustic energy at the receiver $R_1$, a negative ($-\Delta t$) pulse representing a first arrival of acoustic energy at the receiver $R_2$, or the absence of a pulse which indicates simultaneous arrival of acoustic energy at the receivers. The accuracy of the measurement for closely occurring acoustic waves depends, of course, on the equality of the signal amplitudes. In general, it has been found that this assumption of equal attenuation of the acoustic waves between the centrally located transmitter and the two closely spaced receivers of each pad is a reasonable one. Where greater accuracy is desired, it can be attained by processing each of the receiver signals through an automatic gain control circuit before it is applied to the differential amplifier 46. In most cases, however, the discrepancy in arrival times caused by a discontinuity or nonhomogeneity of the surrounding formations will be sufficiently pronounced so that the dip of the formations can be reliably determined with the apparatus shown in FIG. 5 alone.

Graph (h) of FIG. 6 depicts a representative train of pulses, on a compressed time scale, such as might be developed by the FIG. 5 system in response to signals received from the receivers in one of the pads. As these pulses travel over the conductor 28 in the cable 12 to the recording and display equipment 26 located at the surface (FIG. 1), the individual sharp pulses lose definition through filtering performed on the pulses by the characteristic impedance of the cable. At the surface, therefore, the separate pulse groupings 59 (FIG. 6(h)) of the same polarity representing either $+\Delta t$ or $-\Delta t$ appear as single pulses 60 (FIG. 7) having widths corresponding to the longitudinal dimension of the stratum or discontinuity at the wall of a borehole and the transducer spacing.

As seen in FIG. 7, the logs provided by each of the pads 20a, 20b and 20c are recorded as a function of tool depth and may, therefore, be correlated to determine the dip and azimuthal direction of a particular formation layer. For this purpose, the recording equipment 26 may include a recording potentiometer in which the record is transported as a function of the motion of the cable 12. Anomalous indications in the logs of FIG. 7, such as the small pulses representing spurious noise, may be easily distinguished in the three-level log presentation since a corresponding indication would not appear at the expected points along one of the other logs. It is thus seen that the system is capable of providing logs which indicate not only the disposition of a particular formation traversed by a borehole, but also its thickness and relative acustic transmission properties immediately upon visual inspection of the log record.

Figure 8:
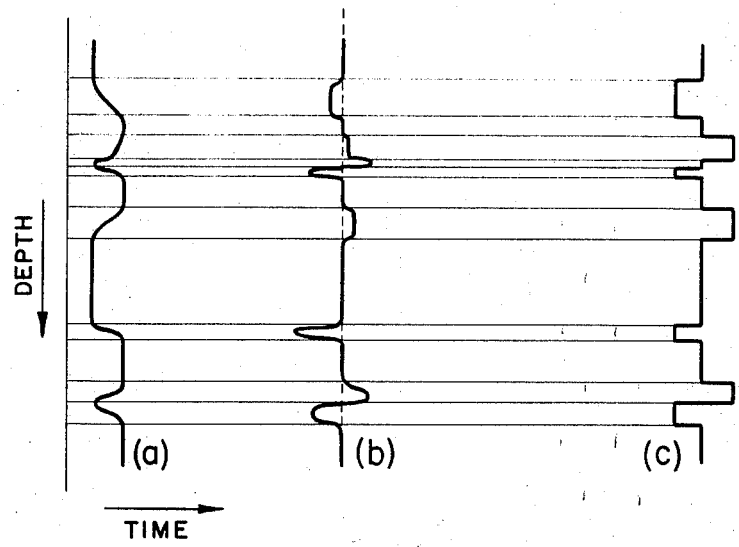
FIG. 8 is a series of graphs including a further type of log which may be obtained with the system and apparatus shown in FIGS. 1 and 5.

FIG. 8 shows three logs yielding time of arrival information, in which graph (a) represents a log of the type produced in systems which measure the true or idealized relative time of arrival $\Delta t$ of an acoustic signal arriving from the same direction at a pair of spaced receivers. Graph (b) depicts a log which would be produced in the FIG. 5 system upon comparing the arrival time of acoustic energy at the other receiver. In both graphs (a) and (b), the amplitude of the curve corresponds to the difference between arrival times at a receiver pair. In FIG. 5, the log shown in FIG. 8(b) may be derived by feeding the differentiated pulses from the flip-flops 55a, 55b directly into an analog converter 65. The converter 65 might include, for example, a clock pulse generator, and a gate that is enabled by the first of the flip-flop pulses to be produced to admit pulses from the clock pulse generator to a conventional binary-analog converter unit. Upon occurrence of a pulse from the other of the flip-flops 55a, 55b the gate is turned off or reset to block further passage of the clock pulses to the binary-analog converter, the output of which would then be an analog signal having an amplitude corresponding to the number of clock pulses admitted in the interval between successive trigger pulses. When the next pad is selected, a pulse from the unit 42 over the conductor 66 clears the analog converter 65 and transfers the output in the form of a pulse to the output conductor 67. A series of such pulses is smoothed by the filtering effect of the cable 12 to give the continuous curve shown in FIG. 8(b).

As the system has been described, all electronic apparatus is carried by the logging tool, with the possible exception of the pulse generator 40. It is understood, however, that certain portions of the FIG. 5 system, for example, the analog converter 65, may be located at the surface. In such case, it may be desirable to install filters between the respective output leads and the recorder to obtain a smooth logging display.

The log shown in FIG. 8(b) is approximately a true derivative of the more conventional $\Delta t$ log shown in FIG. 8(a). This arises from the fact that the system of FIG. 5 detects the difference in arrival times of acoustic signals traveling through the formations in mutually opposite longitudinal directions over a relatively small span. While this span is not infinitesimally small as would be required for a true derivative curve, it is nevertheless small enough to obtain a valuable and reasonably accurate derivative of the $\Delta t$ curve.

The three level presentation shown in FIG. 8(c) may be developed by processing the output of the analog converter 65 through a conventional polarity detector 68, which produces a pulse of predetermined amplitude and of a polarity corresponding to the arithmetic sign of the instantaneous amplitude of the analog signal. The three level output from 53a or 68 is in a form that may be readily applied to the input of a digital computing equipment to correlate and compute the amount and direction of the formation dip. To aid in correlation, the tool 10 is provided with a suitable compass for directional reference and a conventional borehole inclinometer such as that disclosed in U.S. Pat. No. 2,992,492, issued July 18, 1961.

From the foregoing, it is seen that the present invention provides an improved logging method and system for determining with superior resolution the characteristics and dispositions of formations surrounding a borehole. Moreover, because of the special transducer array and the unique processing and presentation of time of arrival information, the resultant log may be easily and accurately correlated.

Although the invention has been described with reference to specific embodiments thereof, it is understood that many modifications and variations, both in form and detail, may be made within the skill of the art. All such modifications and variations, therefore, are intended to be included within the scope and spirit of the invention as defined in the appended claims.

I claim:
1. In a method for examining earth formations surrounding a borehole, the steps of:
   transmitting acoustic energy through the formations in mutually opposite longitudinal directions from an acoustic energy source;
   generating first and second electrical signals, respectively, in response to the arrival of the acoustic energy traveling in the respective opposite directions at first and second stations longitudinally equidistant from the source, said first and second signals having amplitudes which vary with time; and
   comparing the first and second electrical signals at a selected instant of time to develop a pulse output signal having a polarity, relative to a reference signal level, representing the sign of the arithmetical difference between the amplitudes of the first and second signals at the selected instant of time, said polarity in turn representing the relative times of arrival of the acoustic energy at the respective stations.

2. A method for determining the dip in earth formations traversed by a borehole, comprising the steps of:
   transmitting acoustic energy through the formations in mutually opposite longitudinal directions from at least three points in mutually spaced angular relation about the axis of the borehole;
   generating first and second electrical signals, respectively, in response to the arrival of acoustic energy traveling in the respective directions at first and second locations spaced longitudinally equidistantly from each respective transmission point, said electrical signals having amplitudes which vary with time;
   comparing the amplitudes of the first and second signals associated with each point at a selected instant of time to develop first through third pulse output signals having polarities, relative to a reference level, representative of the relative times of arrival of acoustic energy at the respective first and second locations; and
   recording the first through third electrical output signals developed at various depths along the borehole, whereby the dip of formation strata may be determined by correlating the recording of the output signals corresponding to the respective transmission points.

3. A method as defined in claim 2, further comprising:
   transmitting the first through third pulse output signals to the earth's surface for recording thereof at the surface.

4. A method as set forth in claim 3, in which:
the acoustic energy is transmitted through the formations from the three points in sequence to sequentially produce the first through third pulse output signals; and
the respective pulse output signals are transmitted sequentially to the earth's surface over a common transmission path.

5. A method as defined in claim 2, in which:
each of the first through third pulse output signals is recorded as a separate record as a function of depth of the tool in the borehole by which the angle of inclination of formations relative to the well tool may be determined.

6. In apparatus for acoustically logging earth formations surrounding a borehole:
a well tool adapted for longitudinal movement through the borehole;
electroacoustic means carried by the tool and including a pair of spaced electroacoustic receivers and an electroacoustic transmitter disposed longitudinally between the receivers of the pair, the receivers being effective to develop first and second electrical signals in response to acoustic energy received in the borehole, said electrical signals having amplitudes which vary with time;
means for exciting the transmitter to transmit acoustic energy through the formations in mutually opposite longitudinal directions from the transmitter;
means for comparing the amplitudes of the first and second signals at a selected instant of time to develop a pulse output signal having a polarity, relative to a reference level, representative of the relative times of arrival of acoustic energy at the respective ones of the receiver pair; and
an output conductor receiving the pulse output signal.

7. Apparatus as defined in claim 6, in which the transmitter is disposed laterally of the receiver pair.

8. In apparatus for acoustically logging earth formations surrounding a borehole:
a well tool adapted for longitudinal movement through the borehole;
electroacoustic means carried by the tool and including an electroacoustic transmitter and a pair of electroacoustic receivers disposed in mutually opposite longitudinal directions from the transmitter for receiving substantially coincidentally acoustic energy transmitted through a homogeneous formation from the transmitter and generating first and second electrical signals, respectively, in response thereto;
means for exciting the transmitter to transmit acoustic energy longitudinally through the formations toward the respective receivers;
means for developing a sampling signal in response to one of the first and second electrical signals;
means for comparing the amplitudes of the first and second signals at a selected instant of time to derive a difference signal; and
means jointly responsive to the sampling signal and to the difference signal for producing an output signal having a characteristic polarity representative of the arithmetical difference between the travel times of acoustic energy between the transmitter and the respective receivers.

9. Apparatus as defined in claim 8, in which the first and second electrical signals are periodic waveforms and the sampling signal developing means is effective to produce a pulse whose duration is less than the half period of the first and second electrical signal waveforms.

10. Apparatus for determining the dip in earth formations traversed by a borehole comprising:
a well tool adapted for longitudinal movement through the borehole;
at least three electroacoustic devices carried by the tool in laterally mutually spaced relation, each device including an electroacoustic transmitter and a pair of electroacoustic receivers disposed in mutually opposite longitudinal directions from the transmitter for receiving substantially coincidentally acoustic energy transmitted through a homogeneous formation from the transmitter and generating first and second electrical signals, respectively, in response thereto;
means for exciting the transmitters of the respective devices to transmit acoustic energy through the formations toward the respective receivers;
means for comparing the phase of the first and second signals from each device at a selected instant of time to develop first through third pulse output signals representative of the respective relative times of arrival of acoustic energy at the receiver pairs of each device, each of said pulse output signals having a characteristic polarity, relative to a reference signal level, representing the arithmetic sign of such relative time of arrival; and
means for recording the first through third output signals as a function of the depth of the tool in the borehole.

11. Apparatus as defined in claim 10 in which:
the transmitter exciting means includes means for sequentially selecting the transmitters for excitation to thereby successively produce the first through third output signals from the comparing means.

12. Apparatus as defined in claim 10 in which the apparatus includes an output conductor and the comparing means includes:
means for developing first and second pulses in response to the respective first and second electrical signals;
means for comparing the instantaneous amplitudes of the first and second electrical signals to derive a difference signal; -
means responsive to one of said first and second pulses to develop a sampling signal; and
gating means receiving the difference signal and responsive to the sampling signal to connect the output signals to the output conductor.

13. Apparatus according to claim 12, further comprising:
a separate output conductor;
analog converter means responsive to the first and second pulses for generating an electrical analog function of the difference between occurrences of such pulses; and
means for connecting the electrical analog function to the separate output conductor.

14. Apparatus as defined in claim 13, further comprising:
polarity detector means responsive to the electrical analog function for developing a pulse train in which each pulse corresponds in polarity and duration to excursions of the electrical analog function from a reference signal level to produce an acoustic travel time derivative pulse output; and
means for simultaneously recording the derivative pulse output.

15. Apparatus for determining the dip in earth formations traversed by a borehole comprising:
a well tool adapted for longitudinal movement through the borehole;
at least three electroacoustic devices carried by the tool in laterally mutually spaced relation, each device including an electroacoustic transmitter and a pair of electroacoustic receivers disposed in mutually opposite longitudinal directions from the transmitter for receiving substantially coincidentally acoustic energy transmitted through a homogeneous formation from the transmitter and generating first and second electrical signals, respectively, in response thereto;
means for exciting the transmitters of the respective devices to transmit acoustic energy through the formations toward the respective receivers, and means jointly responsive to the first and second signals from each device for developing first through third output signals having a characteristic polarity, relative to a signal reference level, representative of a function of the difference between the times of arrival of acoustic energy at the receiver pairs of each device.

16. In apparatus for acoustically logging earth formations surrounding a borehole:
a well tool adapted for longitudinal movement through the borehole;
electroacoustic means carried by the tool and including a pair of spaced electroacoustic receivers and an electroacoustic transmitter disposed longitudinally between the receivers of the pair, the receivers being effective to develop first and second electrical signals in response to acoustic energy received in the borehole;
means for exciting the transmitter to transmit acoustic energy through the formations in mutually opposite longitudinal directions from the transmitter; and
means for comparing the amplitudes of the first and second signals at a select instant of time to develop an output signal representative of the relative times of arrival of acoustic energy at the respective ones of the receiver pairs, said output signal having an electrical quantity which assumes one of three discrete values, two of the discrete values representing the sign of the arithmetical difference between the travel times of the acoustic energy through the formations received by the respective receivers, the third of such values being different than said two discrete values to establish a reference signal level.

17. In apparatus for acoustically logging earth formations surrounding a borehole;
a well tool adapted for longitudinal movement through the borehole;
electroacoustic means carried by the tool and including an electroacoustic transmitter and a pair of electroacoustic receivers disposed in mutually opposite longitudinal directions from the transmitter for receiving substantially coincidentally acoustic energy transmitted through a homogeneous formation from the transmitter and generating first and second electrical signals, respectively, in response thereto;
means for exciting the transmitter to transmit acoustic energy longitudinally through the formations toward the respective receivers;
means for developing a sampling signal in response to one of the first and second electrical signals, said sampling signal being delayed from the occurrence of one of said electrical signals; and
means jointly responsive to the sampling signal and to the first and second signals for producing an output signal representative of the arithmetical difference between the travel times of acoustic energy between the transmitter and the respective receivers.

18. In apparatus for acoustically logging earth formations surrounding a borehole:
a well tool adapted for longitudinal movement through the borehole;
electroacoustic means carried by the tool and including an electroacoustic transmitter and a pair of electroacoustic receivers disposed in mutually opposite longitudinal directions from the transmitter for receiving substantially coincidentally acoustic energy transmitted through a homogeneous formation from the transmitter and generating first and second electrical signals, respectively, in response thereto, said electrical signals varying periodically in amplitude;
means for exciting the transmitter to transmit acoustic energy longitudinally through the formations toward the respective receivers;
means responsive to the first and second electrical signals for generating first and second pulses, respectively, the occurrence of the first and second pulses corresponding in time to the first received amplitude variation of the respective electrical signals.
means for selecting only the first-occurring of the first and second pulses for each transmission of acoustic energy to derive a delay control signal;
delay means responsive to the delay control signal for generating a sampling signal displaced in time from the initiation of the first-occurring of the first and second pulses; and
means jointly responsive to the sampling signal and to the first and second signals for producing an output signal representative of the arithmetical difference between the travel times of acoustic energy between the transmitter and the respective receivers.

19. Apparatus for acoustically logging earth formations surrounding a borehole, comprising:
a well tool adapted for longitudinal movement through the borehole;
electroacoustic means carried by the tool and including a pair of spaced electroacoustic receivers and an acoustic transmitter longitudinally intermediate the receivers, the receivers being operative to develop first and second electrical signals, respectively, in response to transmitted acoustic energy received thereby in the borehole, the electrical signals having amplitudes varying with time;
means for exciting the transmitter to transmit acoustic energy in mutually opposite longitudinal directions therefrom;
pulse generator means connected to each of the receivers for developing an intermediate pulse when the respective electrical receiver signal exceeds a predetermined signal reference level;
means for selecting the first of the intermediate pulses from the pulse generator means;
delay means for producing a control signal delayed from the occurrence of the selected pulse;
means for comparing the amplitudes of the electrical receiver signals to develop an output signal representative of the difference in the instantaneous amplitudes thereof; and
means jointly responsive to the output signal and the control signal for generating an output pulse having a characteristic polarity, relative to a signal reference level, representing the relative time of the arrival of the acoustic energy at the respective receivers.

References Cited

UNITED STATES PATENTS

| | | | |
|---|---|---|---|
| 2,233,992 | 3/1941 | Wyckoff | 181—.5 |
| 2,301,458 | 11/1942 | Salvatori | 181—.5 |
| 3,191,145 | 6/1965 | Summers | 181—.5 |
| 3,251,221 | 5/1966 | Vogel et al. | 181—.5 |
| 3,295,100 | 12/1966 | Armistead | 181—.5 |
| 3,376,950 | 4/1968 | Grine | 181—.5 |

FOREIGN PATENTS 727,790   2/1966   Canada.

RODNEY D. BENNETT, Jr., Primary Examiner

D. C. KAUFMAN, Assistant Examiner

U.S. Cl. X.R.
181—.5; 340—18